United States Patent
Yuan

(10) Patent No.: US 9,698,850 B1
(45) Date of Patent: Jul. 4, 2017

(54) PROTECTIVE CASE WITH SCREEN-CLEANING FUNCTION FOR ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jiang-Tao Yuan, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/047,126

(22) Filed: Feb. 18, 2016

(30) Foreign Application Priority Data

Dec. 9, 2015 (CN) .......................... 2015 1 0904688

(51) Int. Cl.
*H04W 88/02* (2009.01)
*H04B 1/3888* (2015.01)

(52) U.S. Cl.
CPC ................................ *H04B 1/3888* (2013.01)

(58) Field of Classification Search
CPC ... A45C 11/00; A45C 2011/002; A47L 13/16; A47L 13/17; A47L 25/00; H04B 1/3888
USPC ...... 455/575.8, 556.1; 206/205, 701, 38, 37, 206/45.2; 361/679.01, 825; 15/104.92, 15/104.93, 105, 210.1; 248/125.7; 134/6
See application file for complete search history.

(56) References Cited

U.S. PATENT DOCUMENTS

| | | | |
|---|---|---|---|
| 2010/0011524 A1* | 1/2010 | Roeback | B08B 1/00 15/105 |
| 2010/0243516 A1* | 9/2010 | Martin | G11B 31/00 206/701 |
| 2011/0284025 A1* | 11/2011 | Lemchen | G06F 3/041 134/6 |
| 2012/0138490 A1* | 6/2012 | Hollander | A45C 11/00 206/205 |
| 2012/0309475 A1* | 12/2012 | Johnson | H04M 1/04 455/575.8 |
| 2013/0088815 A1* | 4/2013 | Hu | G06F 1/1628 361/679.01 |
| 2013/0252679 A1* | 9/2013 | Yang | H04B 1/3888 455/575.8 |
| 2014/0137348 A1* | 5/2014 | Lodge | B08B 1/006 15/104.92 |
| 2015/0143648 A1* | 5/2015 | Batey | A45C 11/00 15/104.93 |
| 2015/0172431 A1* | 6/2015 | Huang | H04B 1/3888 455/556.1 |
| 2015/0374194 A1* | 12/2015 | Lee | B32B 7/12 15/104.93 |

(Continued)

*Primary Examiner* — Tan H Trinh
(74) *Attorney, Agent, or Firm* — Steven Reiss

(57) ABSTRACT

A protective case with a function of clearing and cleaning a display screen of an electronic device includes a case body, a clear component, and a mounting component. The case body defines a receiving space in which the electronic device is held and an opening at one end of the case body. Two opposite slide grooves are provided in the case body. The clear component on the mounting component can be pushed from an end of the case body along the display screen of the electronic device, to clear and clean it.

8 Claims, 5 Drawing Sheets

(56) References Cited

U.S. PATENT DOCUMENTS

2016/0014922 A1\* 1/2016 Banerjee .............. A45C 7/0031
206/38

\* cited by examiner

PROTECTIVE CASE WITH SCREEN-CLEANING FUNCTION FOR ELECTRONIC DEVICE

CROSS-REFERENCE TO RELATED APPLICATIONS

This application claims priority to Chinese Patent Application No. 201510904688.0 filed on Dec. 9, 2015, the contents of which are incorporated by reference herein.

FIELD

The subject matter herein generally relates to protective cases, and more specifically, relates to a protective case of an electronic device, which can clear and clean a display screen of the electronic device.

BACKGROUND

Electronic devices such as mobile phones are ubiquitous. Mobile phones may be provided with protective cases to protect the mobile phone from being scratched.

BRIEF DESCRIPTION OF THE DRAWINGS

Implementations of the present disclosure will be described, by way of example only, with reference to the attached figures.

DETAILED DESCRIPTION

Figure 1:
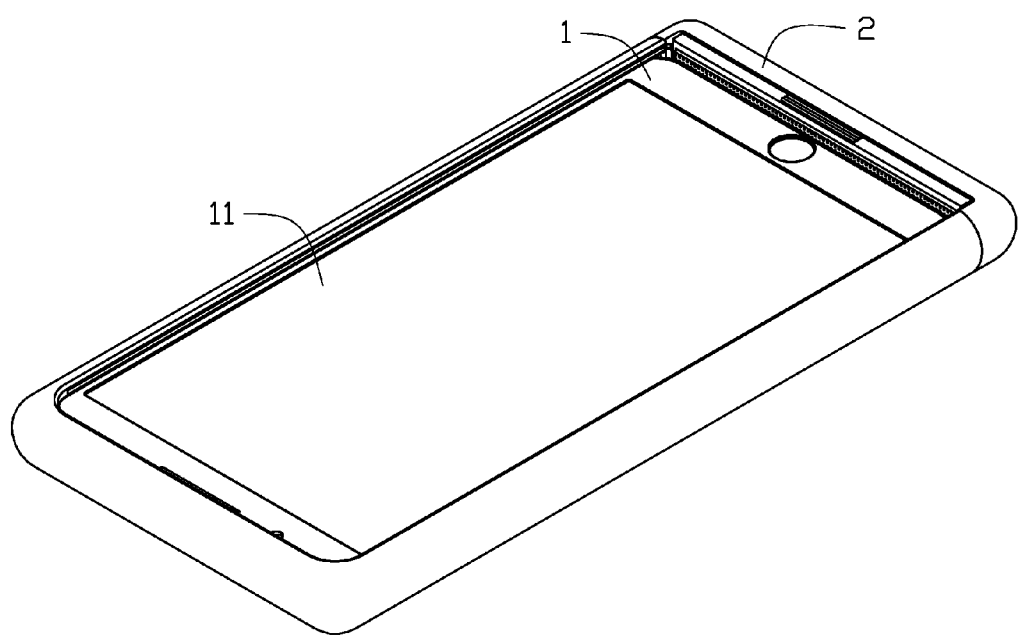
FIG. 1 is a diagrammatic view of an electronic device and a protective case.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The present disclosure, including the accompanying drawings, is illustrated by way of examples and not by way of limitation.

Several definitions that apply throughout this disclosure will now be presented.

References to "a/an" or "one" in this disclosure are not necessarily referring to only one object, such references mean "at least one." The term "comprising" means "including, but not necessarily limited to"; it specifically indicates open-ended inclusion or membership in a so-described combination, group, series and the like.

FIG. 1 is a diagrammatic view of an electronic device and a protective case for the electronic device. In at least one embodiment shown in FIG. 1, the electronic device 1 includes a display screen 11. The display screen 11 can be, but is not limited to, a touch screen. The protective case 2 can receive the electronic device 1. The protective case 2 can further clear and clean the display screen 11 of the electronic device 1.

Figure 2:
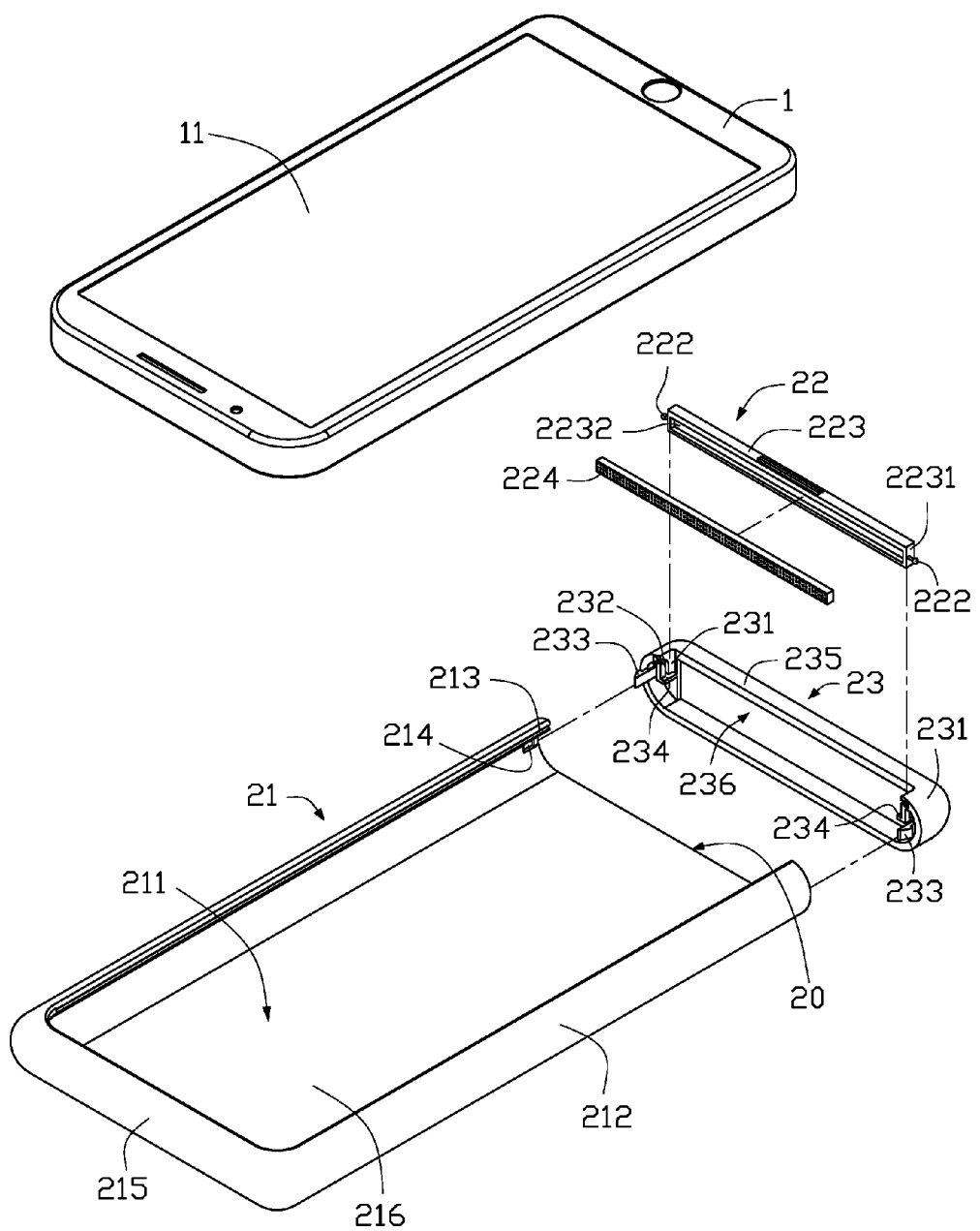
FIG. 2 is an exploded diagrammatic view of the protective case shown in FIG. 1, in a first state.

FIG. 2 shows the protective case 2. The protective case 2 includes a case body 21, a clear component 22, and a mounting component 23. The mounting component 23 can mount the clear component 22 on the case body 21.

The case body 21 includes two first side walls 212, a second side wall 215, and a bottom plate 216. The two first side walls 212 are opposite to each other. A receiving space 211 is formed by the two first side walls 212, the second side wall 215 and the bottom plate 216, for receiving the electronic device 1. An opening 20 is provided at one end of the case body 21 and opposite to the second side wall 215. Each of the first side walls 212 defines a first slide groove 213.

The mounting component 23 can interlock with the end of the case body 21 having the opening 20. The mounting component 23 can connect to the receiving space 211. The mounting component 23 includes two third side walls 231 and a fourth side wall 235. The fourth side wall 235 connects to the two third side walls 231. The two third side walls 231 are opposite to each other, and each of the two third side walls 231 corresponds to one of the two first side walls 212. The fourth side wall 235 corresponds to the second side wall 215. Each of the two third side walls 231 defines a second slide groove 232. The second slide groove 232 can connect to the first slide groove 213.

The clear component 22 includes two sliders 222. Each of the sliders 222 can be selectively received in the first slide groove 213 or the second slide groove 232, and further can slide from the second slide groove 232 to the first slide groove 213. In the illustrated embodiment, the sliders 222 are round.

When the mounting component 23 interlocks with the case body 21, each slider 222 of the clear component 22 is received in one or other of the two second slide grooves 232 of the mounting component 23. As the second slide grooves 232 connects to the first slide grooves 213, the two sliders 222 can slide from the second slide grooves 232 to the first slide grooves 213 when the clear component 22 is pushed. Constrained in and by the first slide grooves 213, the clear component 22 can be further pushed and pulled to traverse the display screen 11 of the electronic device 1, to clear and clean it.

Figure 3:
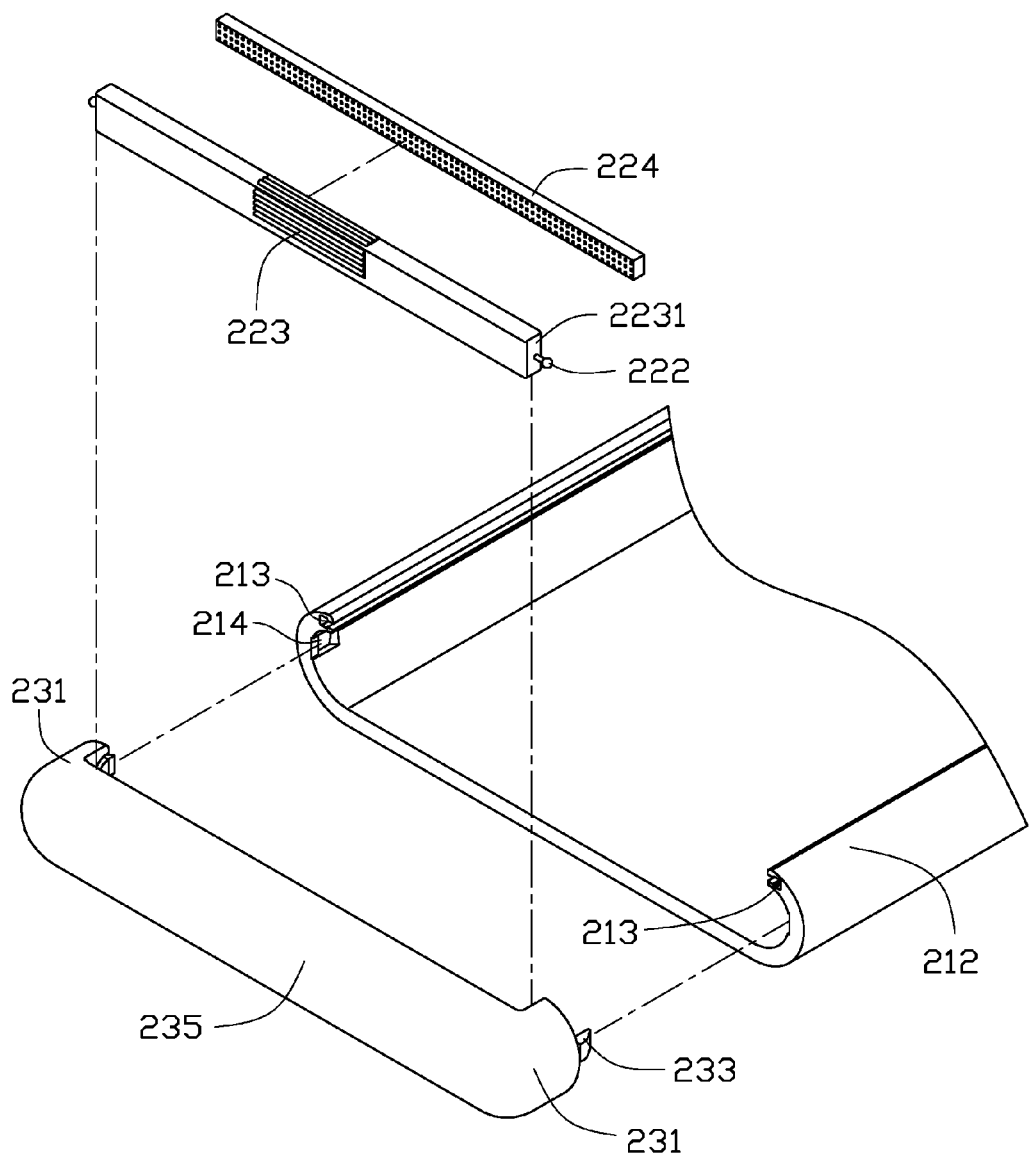
FIG. 3 is an exploded, partial, diagrammatic view of the protective case shown in FIG. 2, in a second state.

FIG. 3 shows the protective case 2 in a second state. Each of the third side walls 231 of the mounting component 23 defines a fastening clasp 233. Each of the first side walls 212 of the case body 21 defines a fastening slot 214. The fastening slots 214 correspond to the fastening clasps 233. The mounting component 23 is connected with the case body 21 when the fastening clasps 233 clasp the fastening slots 214. The mounting component 23 is disconnected from the case body 21 when the fastening clasps 233 are released from the fastening slots 214. In at least one embodiment, the fastening clasps 233 are located under the second slide grooves 232. The fastening slots 214 are located under the first slide grooves 213.

A support component 234 extends from each of the third side walls 231 of the mounting component 23 and each support component 234 corresponds to the second slide groove 232. A second receiving space 236 is formed via the two support components 234 and the fourth side wall 235 for receiving the clear component 22. The clear component 22 is in contact with the two support components 234 when the clear component 22 is received in the second receiving space 236.

The clear component 22 includes a clear case 223 and a clear portion 224. The clear portion 224 is arranged on the clear case 223. In at least one embodiment, the clear case 223 is cuboid. A slider 222 is arranged on each one of the two opposite side surfaces 2231 of the clear case 223. In the illustrated embodiment, the clear portion 224 is arranged on a bottom surface 2232 of the clear case 223. The bottom surface 2232 faces the electronic device 1. In an alternative embodiment, the clear portion 224 can be arranged on a front side surface or a back side surface of the clear case 223. The clear portion 224 can clear and clean the display screen 11 of the electronic device 1 when the clear component 22 is slid in the first slide grooves 213. The clear portion 224 is made from activated carbon foam. The activated carbon foam can contain a cleaning solvent.

Figure 4:
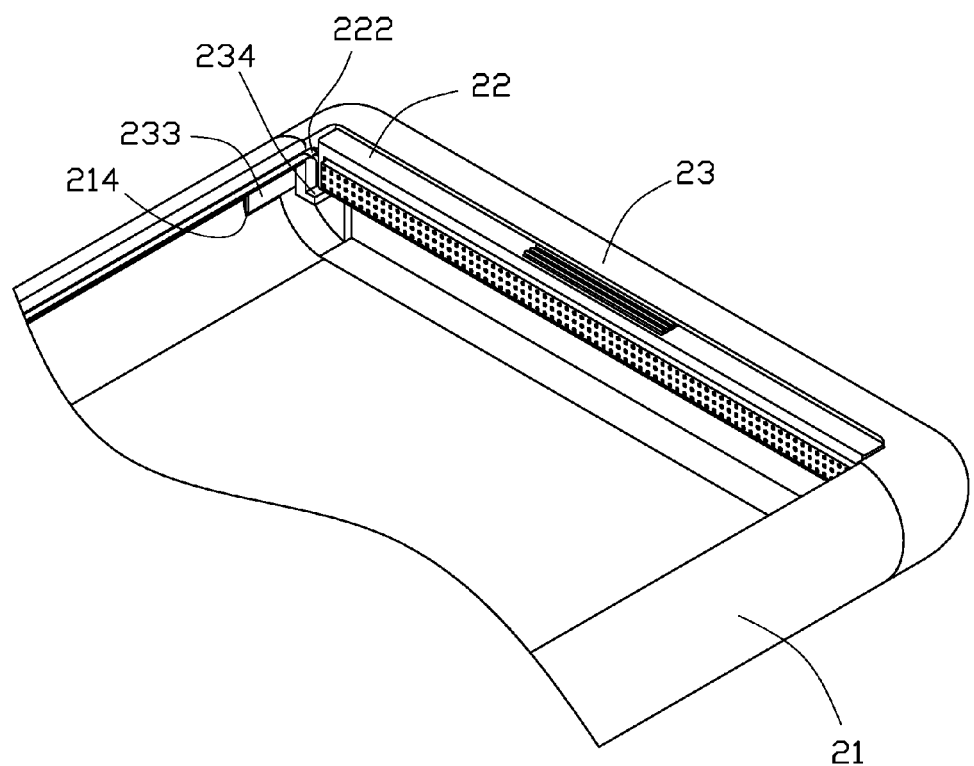
FIG. 4 is a partial, diagrammatic view of the protective case shown in FIG. 3, in a third state.
Figure 5:
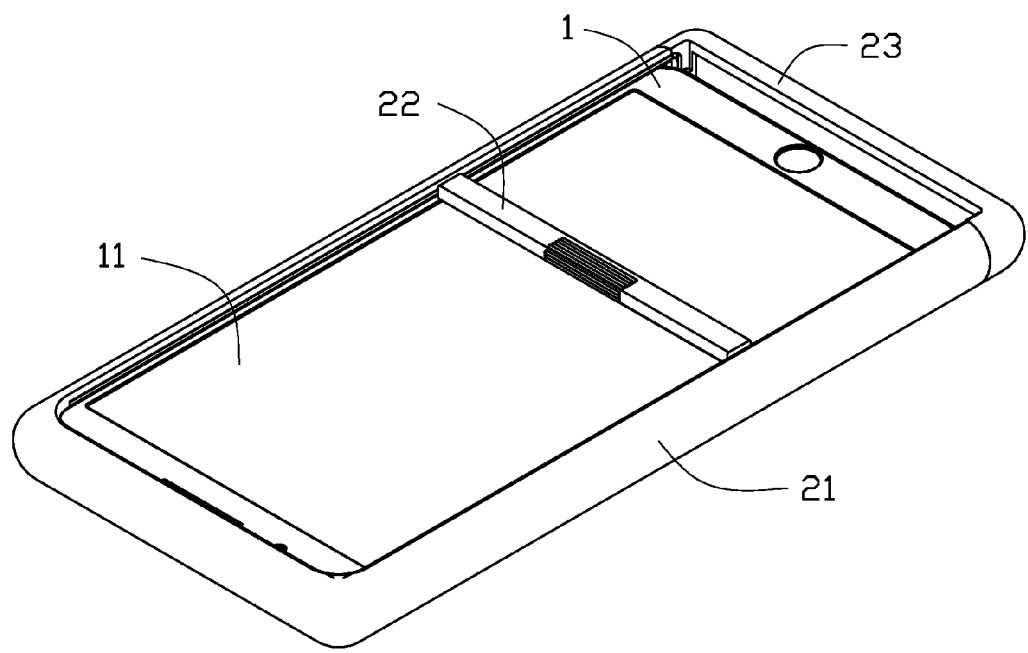
FIG. 5 is a diagrammatic view of a cleaning component of the protective case of FIG. 1, in a state of use.

FIG. 4 shows the protective case 2 in a third state. FIG. 5 shows the clear component 22 of the protective case 2 in use. When the protective case 2 is employed, the electronic device 1 is received in the first receiving space 211 of the case body 21 of the protective case 2, and the clear component 22 is received in the second receiving space 236 of the mounting component 23. The fastening clasps 233 of the mounting component 23 then clasp to the fastening slots 214 of the case body 21, which connects the mounting component 23 and the case body 21 together. After that, the clear component 22 can be pushed from the second slide groove 232 to the first slide groove 213, and the clear portion 224 of the clear component 22 can clear and clean the display screen 11 of the electronic device 1 as it slides further.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A protective case configured to clean and clear a display screen of an electronic device, the protective case comprising:
   a case body defining a receiving space configured to receive the electronic device and an opening at one end of the case body, the case body defining two opposite first slide grooves;
   a clear component configured to clear and clean the display screen of the electronic device;
   a mounting component configured to mount the clear component on the case body; wherein the clear component is pushed and pulled to travel along the display screen of the electronic device, wherein the clear component comprises two sliders, the mounting component comprises two third side walls and a fourth side wall connecting to the two third side walls, each of the two third side walls defines a second slide groove, the second slide groove connects to the first slide groove, each of the sliders is selectively received in the first slide groove or the second slide groove, and further slides from the second slide groove to the first slide groove.

2. The protective case according to claim 1, wherein the case body comprises two first side walls, a second side wall, and a bottom plate, the receiving space is formed by the three side walls and the bottom plate, the opening is formed at one end of the case body and opposite to the second side wall, each of the two first slide grooves is provided on the first side walls of the case body.

3. The protective case according to claim 1, wherein each of the third side walls of the mounting component defines a fastening clasp, each of the first side walls of the case body defines a fastening slot, the fastening slots corresponds to the fastening clasps, the mounting component is connected together with the case body when the fastening clasps clasp the fastening slots, the mounting component is disconnected from the case body when the fastening clasps are released from the fastening slots.

4. The protective case according to claim 1, wherein each of the third side walls of the mounting component extends out a support component, the two support component and the fourth side wall form a second receiving space for receiving the clear component, the clear component is in contact with the two support components when the clear component is received in the second receiving space.

5. The protective case according to claim 1, wherein the clear component comprises a clear case and a clear portion arranged on the clear case.

6. The protective case according to claim 5, wherein each of the two sliders is respectively arranged on one of the two opposite side surfaces of the clear case facing the third side walls of the mounting component, the clear portion is arranged on the bottom surface of the clear case for clearing the display screen of the electronic device while the two sliders of the clear component slide in the first slide grooves of the case body.

7. The protective case according to claim 5, wherein the clear portion is made from activated carbon foam.

8. The protective case according to claim 5, wherein the sliders are round.

* * * * *